United States Patent [19]

Adams et al.

[11] 3,783,218

[45] Jan. 1, 1974

[54] ELECTROSTATIC BONDING PROCESS

[75] Inventors: Norbert Adams, Syracuse; Edward A. Baum, Liverpool, both of N.Y.

[73] Assignee: General Electric Company, Syracuse, N.Y.

[22] Filed: Jan. 12, 1972

[21] Appl. No.: 217,117

[52] U.S. Cl. .............. 219/10.53, 29/471.9, 29/472.9
[51] Int. Cl. .............. B23k 13/02
[58] Field of Search .............. 29/472.9, 497.5, 29/471.9; 219/10.53; 156/272; 204/16

[56] References Cited

UNITED STATES PATENTS

| | | | |
|---|---|---|---|
| 3,256,598 | 6/1966 | Kramer et al. | 156/272 X |
| 3,397,278 | 8/1968 | Pomerantz | 156/272 X |
| 3,417,459 | 12/1968 | Pomerantz et al. | 29/472.9 |
| 3,506,424 | 4/1970 | Pomerantz | 156/272 X |
| 3,589,965 | 6/1971 | Wallis et al. | 156/272 |

*Primary Examiner*—Robert D. Baldwin
*Assistant Examiner*—Ronald J. Shore
*Attorney*—Robert J. Mooney et al.

[57] ABSTRACT

A process is disclosed for uniting a plurality of one or more vitreous members with one or more metallic members. The metallic members can be bodies of semiconductor material of either the monatomic or compound type. Such bodies are united in accordance with the invention by the process involving the application of heat and the simultaneous application of a magnetic field having flux lines extending in the plane of the surfaces to be united, and an electrostatic field.

8 Claims, 4 Drawing Figures

PATENTED JAN 1 1974 3,783,218

ELECTROSTATIC BONDING PROCESS

The present invention relates to improvements in the art of bonding thin metal members to thin glass members over small areas of the order of a few square centimeters and smaller.

In the electrical as well as other arts, many applications exist for the uniting, over a small area, of thin layers of metal to glass members, or the adhering of a thin glass sheet to a metal substrate, to provide a composite structure of metal and glass which can usefully employ the optical or insulative or other properties of the glass while benefitting from a uniformly strong and intimate bond of the metal to the glass. Various prior art techniques for joining metal to glass have had to overcome one or more of the disadvantages of requiring complex equipment, use of very high temperatures sufficient to melt the glass, lengthy heating and cooling times, special chemical processing, and limited choice of materials suitable for a bond of desired quality between the metal and glass. The present invention avoids these disadvantages and provides a bonding process which does not require extreme tempera-tures, which affords a wide range of choice of materials capable of being bonded, and which effectuates an intimate bond between the metal and glass of uniformly high quality in a few seconds time.

One object of my invention is to provide an improved process for intimately bonding a thin metal member or metallic layer to a vitreous support member.

Another object is to provide an improved process for uniting a metal member and a thin glass sheet without heating the glass sheet to its melting point.

Another object is to provide an improved process for uniting a metal member with a glass member in a sealing process requiring only a few seconds duration.

These and other objects of the present invention will be apparent from the following description and the accompanying drawing, wherein.

Briefly, according to one preferred embodiment of my invention, the metal and glass members or layers to be joined are in face-to-face confronting contact, and heated to a relatively low temperature, of approximately 300°–450°C. An electrostatic potential is applied between the heated metal member and the glass member, in magnitude of the order of a few hundred volts and with the glass member being of negative polarity relative to the metal member, in the presence of a strong magnetic field having flux lines extending generally in the plane of the contacting glass and metal surfaces to be united. The positive terminal of the electrostatic voltage supply is connected to the glass member by a needle-pointed probe-like contact which engages the glass over a very tiny area. The resulting effect is not fully understood, but apparently involves the production of a strong localized electrostatic attraction between the glass and metal members, coupled with a localized fusion of the contacting glass and metal surfaces. As a result, when the electrostatic and magnetic fields are removed and the metal and glass members allowed to cool to room temperature, a uniformly high quality bond or seal between the confronting glass and metal surfaces is found to have been formed.

Figure 1:
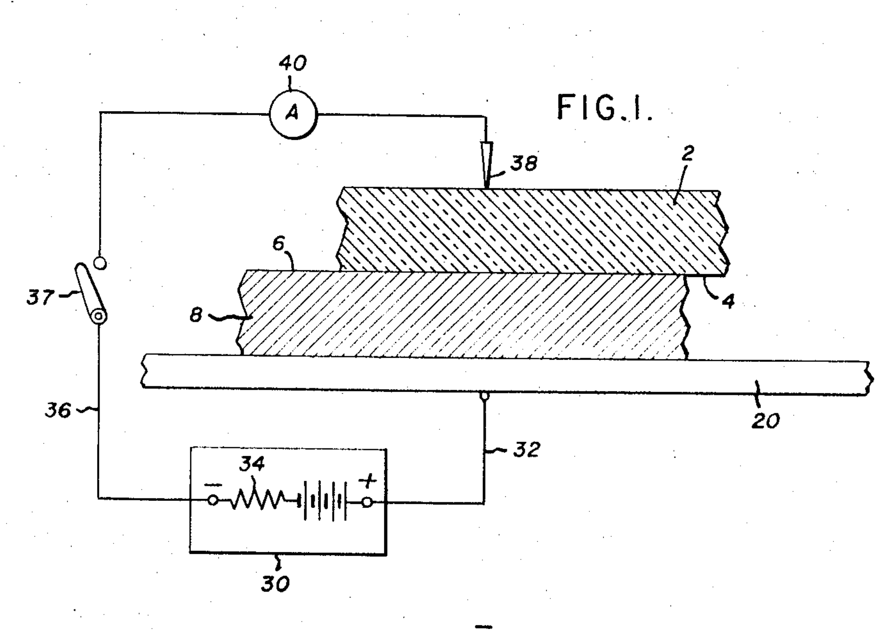
FIG. 1 is a fragmentary sectional view of a metal member and glass member arranged for being united in accordance with the process of the present invention.

Turning to FIG. 1, there is shown a glass member or sheet 2 having a sealing surface 4 arranged in confronting contacting relation with the sealing surface 6 of a metal member 8, for the purpose of enabling the contacting portions of surfaces 4 and 6 to be bonded according to the present invention. For bonding according to the present invention, elevation of the temperature of the members 2 and 8 may be accomplished in any suitable fashion such as by placing the superimposed members 2 and 8 directly on a metallic resistance heating element 20. Heater 20 may consist, for example, of a strip of resistance heating material such as nichrome alloy or the like, through which an electric current of either A.C. or D.C. is passed to provide resistance heating.

For the purpose of providing the electrostatic potential required according to the present invention, the positive terminal of a direct current power supply 30 is connected through lead 32 to the metal member 8, by connecting lead 32 to heater element 20 on which member 8 rests, and the negative terminal of power supply 30 is connected through a current limiting resistor 34, lead 36 and switch 37 to a needle-like probe 38 which is placed in contact with the back surface of the glass member 2, i.e. the surface spaced by the thickness of the member 2 from its sealing surface 4. It will be understood that in FIG. 1, for convenience in showing the sealing surfaces 4 and 6 to a very enlarged scale, power supply 30 has been drawn to a comparatively very diminished scale.

In one embodiment of apparatus used to produce a glass-to-metal bond according to the present invention, the heating element consisted of a strip of nichrome resistance heater material, approximately 2 inches long and ¼ inch wide and 1/20 inch thick, through a 60 hz heating current of approximately 9–100 amperes r.m.s. value was passed to produce the desired heating of glass member 2 and metal member 8 resting on the heating element 20 as shown in FIG. 1 with their sealing surfaces 4, 6 in confronting contact. The glass member had a sealing surface 4 about 40 mils (i.e. 0.040 inch) wide and 50 mils long, and was about 6 mils thick in a direction normal to the sealing surface. The heating was carried out in room air for a period of about 10 to 20 seconds, sufficient to bring the heating element up to a temperature of about 375°C, and during the heating period a magnetic field of about 3,000 to 20,000 gauss intensity and having its flux lines extending substantially in the plane of the contacting sealing surfaces 4, 6 to be joined, was provided by the passage of the heating current through the heating element. After about 10–20 seconds of such heating, and with the negative terminal of the electrostatic potential supply 30, connected to the heating element, the positive terminal of the electrostatic potential supply, of about 300 volts DC, was connected through a limiting resistor 34 of about 3 megohms by the needle-pointed probe to the outer face of the glass sheet, i.e., the face parallel to the glass sealing surface but spaced from the sealing surface by the 6 mil thickness of the glass. A few seconds thereafter, an ammeter 40 in series with the needle-like probe was observed to register a pulse of current, of approximately 250 microamperes and 3 seconds duration, and simultaneously the glass member 2 was observed to exhibit slight surface distortions indicative of the glass sealing surface 4 being slightly plastically deformed and drawn into intimate sealing contact with the metal sealing surface 6. Thereupon the heating element 20 was deenergized, the electrostatic probe 38 removed, and the sealed members allowed to cool in room air to room temperature. A strong intimate and substantially hermetic permanent bond was found to have resulted between the glass and metal members throughout the area of overlap of their sealing surfaces.

The electrostatic field from potential source 30 may be applied in a variety of ways. For example, the switch 37 of FIG. 1 may be maintained permanently closed and the probe 38 may be contacted to the glass member 2 only during the time the electrostatic field is desired to be applied. Or conversely, the probe 38 may be left in continuous contact with the glass member 2 and the power supply 30 connected, as by the switch 37, only during the time the electrostatic field is desired to be applied. The current limiting resistor 34 is provided in order to limit current flow through probe 38 when the heating reduces the glass resistivity and thereupon more current would otherwise flow through the probe than is desired.

In one practical embodiment of a stacked or sandwiched structure such as shown in FIG. 1, the metal member 8 may be an electronic semiconductor material such as monocrystalline or polycrystalline silicon, or a compound semiconductor such as gallium arsenide, gallium phosphide, or gallium arsenide phosphide, or the like, of requisite purity for electronic semiconductor applications. Further, if desired, such semiconductor materials may have a thin coating of silicon dioxide, from about 3000 to 20,000 Angstrom units thick. When such semiconductor materials are used, it is also desirable to use for the glass members glasses of reasonably matching thermal expansion properties and low alkali ion content, such as glasses of the borosilicate family.

It is within the contemplation of the present invention that other magnetic means instead of the essentially single turn air core electromagnet provided by the heater 20, and consisting for example of a permanent magnet or additional electromagnet (not shown) or the like, can be provided to develop the magnetic field used in the above-described sealing process. Any desired magnetic field-developing means may be employed, so long as there is produced a field of density equal to about 3,000–20,000 gauss, and having its flux lines extending through, that is lying in, the plane of the confronting surfaces to be bonded. Also, during the bonding process immersion of the members to be bonded in an inert cover gas has been found to be desirable but not necessary. One suitable cover gas is nitrogen, which may desirably be flowed at approximately atmospheric pressure over the work pieces being bonded.

Figure 2:
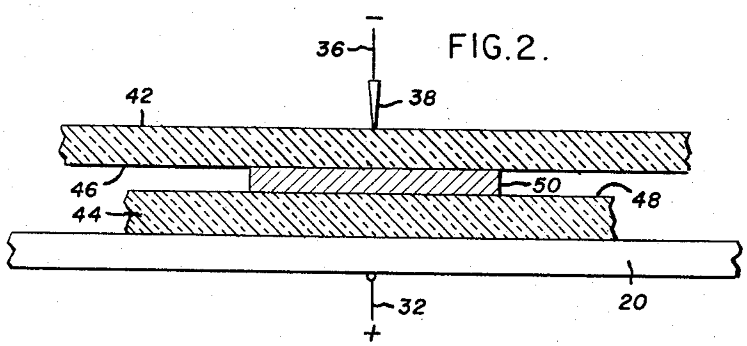
FIG. 2 is a fragmentary sectional view of another embodiment of a composite metal and glass stacked or sandwiched structure to which the sealing process of the present invention may suitable be employed.

FIG. 2 shows another embodiment of members to be sealed by the process above described, and consisting of two glass members 42,44 having sealing surfaces 46, 48 between which is interposed a metal member 50. Treatment according to the sealing process above described, utilizing probe 38, lead 32, heater 20, and power supply 30 as shown in FIGS. 1 and 2, causes the opposite faces of the metal member to seal respectively to the overlapping portions of the confronting sealing surfaces 46, 48 of the respective glass members 42, 44. As with the structure of FIG. 1, metal member 50 may be an electronic semiconductor material.

Figure 3:
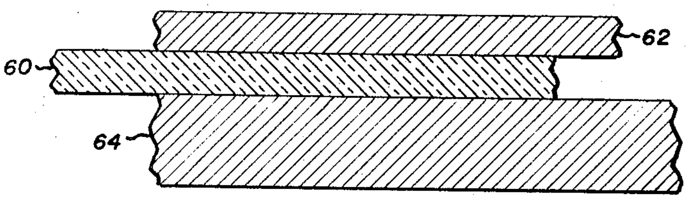
FIGS. 3 and 4 are fragmentary sectional views of other embodiments of sealed glass and metal members according to the present invention.

FIG. 3 shows yet another embodiment of sealed glass and metal members according to the present invention. In FIG. 3, a thin glass layer 60, having for example a thickness of about 5 to 20 mils, is sandwiched between two metal members 62, 64, each having a thickness of about 5 to 20 mils. By the sealing process described in detail in connection with FIG. 1, the overlapping contacting portions of the confronting sealing surfaces of members 60, 62 and 64 may be intimately permanently bonded in a few seconds. As described in connection with FIG. 1, either or both of the metal members 64, 62 may be an electronic semiconductor material. When an electronic semiconductor material such as gallium arsenide was used for member 62, the strength of the seal between it and glass member 60 was observed to be sufficient to pull member 62 apart when it was attempted to separate glass member 60 from member 62 at their sealed interface.

Figure 4:
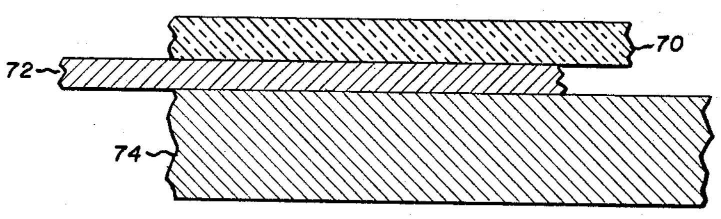

FIG. 4 illustrates still another embodiment of a sealed stacked structure according to the present invention. In FIG. 4, glass member 70 is equipped with a thin layer of metal 72 such as 5,000 to 20,000 Angstrom units thick layer of aluminum, previously applied by any suitable conventionally known technique such as vapor plating or electron beam deposition. Partially overlapping the aluminum layer 72 is a second metal member 74, which may be, for example, a gold layer 0.003 inch thick.

By the process hereinabove described in connection with FIG. 1, placing probe 38 in contact with the face of glass member 70 which is separated by the thickness of the glass from the metal members 72, 74, and by placing the stacked structure on heater element 20 with element 20 contacting member 74, a seal is formed both between members 70 and 72 and 72 and 74, and also member 72 is uniformly tightly drawn against and sealed to glass member 70 in a few seconds. The exposed surfaces of both members 74 and 72 exhibit uniform wetting of the contacted body to which each is sealed, indicating slight deformation of such surfaces as evidence of the intimate and tightly drawn bond between them, as well as formation of a similarly enhanced bond between the glass member 70 and even that portion of metal member 72 not overlapped by metal member 74.

The reasons for the effectiveness of the sealing process above described, and the uniformly intimate and secure bonding of the parts joined by the sealing process, are not fully understood. However it is believed that the magnetic field assists in causing a corona-type discharge of electrons to occur from the negative probe 38 to the adjacent surface, in the vicinity of the high electrostatic field adjacent the probe tip. The discharged electrons are believed to be, in effect, sprayed onto the surface nearest the probe, thereby causing a neutralization of positive ions in the adjacent member to be sealed which in turn produces a strong electrostatic attraction field drawing the sealing surfaces together.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What we claim as new and desire to secure by Letters Patent of the United States is:

1. The process of uniting a vitreous member and a metallic member comprising
 a. placing selected surfaces of said respective members in contact,
 b. heating said contacting surfaces to a temperature of about 300° to 450° Centigrade,
 c. applying to said members a magnetic field having flux lines extending generally in the plane of said contacting surfaces and having a flux density of about 3,000 to 20,000 gauss, and
 d. during the application of said magnetic field independently applying to said members a direct current electrostatic potential of about 250 to 350 volts, said magnetic field assisting in the vicinity of the electrostatic field to bond the contacting surfaces of the members.

2. The process defined in claim 1 wherein said vitreous member is a glass plate having a thickness measured in a direction normal to its selected surface of less than 0.050 inch.

3. The process defined in claim 1 wherein said electrostatic potential is applied to said members for no more than a few seconds.

4. The process defined in claim 1 wherein the positive polarity terminal of said electrostatic field is connected to said metallic member, and the negative polarity terminal of said field is connected to said vitreous member by a needle-like probe.

5. The process defined in claim 1 wherein the heating is accomplished by a resistance-heating element through which about 9 to 100 amperes r.m.s. of 60 hz alternating current or direct current is passed, said metallic member is situated in direct contact with said heating element during said heating, and said vitreous member is situated in direct contact with said metallic member during said heating.

6. The process of uniting two vitreous members and an interposed metallic member comprising
 a. placing selected surfaces of said respective members in contact, b. heating said contacting surfaces to a temperature of about 300° to 450° Centigrade,
 c. applying to said members a magnetic field having flux lines extending generally in the plane of said contacting surfaces and having a flux density of about 3,000 to 20,000 gauss, and
 d. during the application of said magnetic field independently applying to said members a direct current electrostatic potential of about 250 to 350 volts, said magnetic field assisting in the vicinity of the electrostatic field to bond the contacting surfaces of the members.

7. The process of uniting two metallic members and an interposed vitreous member comprising
 a. placing selected surfaces of said respective members in contact,
 b. heating said contacting surfaces to a temperature of about 300° to 450° Centigrade,
 c. applying to said members a magnetic field having flux lines extending generally in the plane of said contacting surfaces and having a flux density of about 3000 to 20000 gauss, and
 d. during the application of said magnetic field independently applying to said members a direct current electrostatic potential of about 250 to 350 volts, said magnetic field assisting in the vicinity of the electrostatic field to bond the contacting surfaces of the members.

8. The process of uniting contacting surfaces of a stack of interposed vitreous and metallic members comprising
 a. placing selected surfaces of said respective members in contact,
 b. heating said contacting surfaces to a temperature of about 300° to 450° Centigrade,
 c. applying to said members a magnetic field having flux lines extending generally in the plane of said contacting surfaces and having a flux density of about 3,000 to 20,000 gauss, and
 d. during the application of said magnetic field independently applying to said members a direct current electrostatic potential of about 250 to 350 volts, said magnetic field assisting in the vicinity of the electrostatic field to bond the contacting surfaces of the members.

* * * * *